(12) United States Patent
Yodaiken et al.

(10) Patent No.: US 7,725,888 B2
(45) Date of Patent: May 25, 2010

(54) SYSTEMS AND METHODS FOR DYNAMICALLY LINKING APPLICATION SOFTWARE INTO A RUNNING OPERATING SYSTEM KERNEL

(75) Inventors: Victor Yodaiken, Socorro, NM (US); Cort Dougan, Socorro, NM (US)

(73) Assignee: Wind River Systems, Inc., Alameda, CA (US)

( * ) Notice: Subject to any disclaimer, the term of this patent is extended or adjusted under 35 U.S.C. 154(b) by 966 days.

(21) Appl. No.: 10/670,802

(22) Filed: Sep. 26, 2003

(65) Prior Publication Data

US 2005/0081220 A1 Apr. 14, 2005

(51) Int. Cl.
*G06F 9/44* (2006.01)
(52) U.S. Cl. ...................................... 717/163
(58) Field of Classification Search .......... 717/162–167
See application file for complete search history.

(56) References Cited

U.S. PATENT DOCUMENTS

| | | | |
|---|---|---|---|
| 5,136,709 A | 8/1992 | Shirakabe et al. | |
| 5,353,411 A | 10/1994 | Nakaosa et al. | |
| 5,778,226 A * | 7/1998 | Adams et al. | ............... 719/311 |
| 6,292,843 B1 | 9/2001 | Romano | |
| 6,463,583 B1 | 10/2002 | Hammond | |
| 6,981,250 B1 * | 12/2005 | Wiltamuth et al. | .......... 717/170 |
| 2003/0101290 A1 | 5/2003 | Lin et al. | |

OTHER PUBLICATIONS

Kempf et al, "Cross-Address Space Dynamic Linking", Sun Microsystems Laboratories, Inc., pp. 0-10, 1992.*
Bos, Herbert, et al., "Safe Kernel Programming in the OKE", IEEE, 2002, pp. 141-152.
Doran, Steven, "Interfacing Low-Level C Device Drivers with Ada 95", ACM, 1999, pp. 133-143.

* cited by examiner

*Primary Examiner*—Ted T Vo
(74) *Attorney, Agent, or Firm*—Fay Kaplun & Marcin, LLP (57) ABSTRACT

The present invention provides systems and methods for dynamically linking modules into a running operating system kernel. Systems and methods described herein have the following advantages: (1) they permit an application programmer to write, compile, execute, and terminate application code that is to be loaded into a kernel as if the application code was an ordinary application program, (2) they allow a standard programming environment to be used to encapsulate application software in a familiar environment, and (3) they permit automatic cleanup of errors and freeing of program resources when the application terminates.

65 Claims, 6 Drawing Sheets

SYSTEMS AND METHODS FOR DYNAMICALLY LINKING APPLICATION SOFTWARE INTO A RUNNING OPERATING SYSTEM KERNEL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

COMPUTER PROGRAM LISTING APPENDIX

A computer program listing appendix incorporating features of the present invention is being submitted herewith on-a compact disc in compliance with 37 C.F.R. §1.52(e), and is incorporated herein by reference in its entirety. The computer program listing appendix is being submitted on a first compact disc labeled "Copy 1" and on a second compact disc labeled "Copy 2." The disc labeled Copy 2 is an exact duplicate of the disc labeled Copy 1. The files contained on each disc are: (1) user.c (size=9406 bytes, creation date=Jul. 10, 2003); (2) Makefile (size=737 bytes, creation date=Jul. 10, 2003); (3) rtl_crt0.c (size=7151 bytes, creation date=Jul. 10, 2003); (4) example.c (size=972 bytes, creation date=Sep. 24, 2003); (5) rtl_mainhelper.h (size=3847 bytes, creation date=Jul. 10, 2003); and (6) rtl_mainhelper.c (size=5438 bytes, creation date=Jul. 10, 2003). The computer program listing and the files contained on the compact discs are subject to copyright protection and any use thereof, other than as part of the reproduction of the patent document or the patent disclosure, is strictly prohibited.

BACKGROUND OF THE INVENTION

1. Field of the Invention

The present invention relates, generally, to systems and methods for dynamically linking application software into a running operating system kernel and, more specifically, to systems, software, hardware, products, and processes for use by programmers in creating such application software, and dynamically loading it into and unloading it from a running operating system kernel.

2. Discussion of the Background

There are many software applications in which it is desirable to link the software or one or more modules of the software into a running operating system kernel. For example, it is generally desirable to link device driver software into the operating system kernel because it enables the device driver software to access kernel data space.

Many operating systems offer utilities for dynamically linking application software (a.k.a, "application code" or "application modules") into a running operating system kernel. Typically, these methods involve copying the application module code and data into kernel memory and then resolving symbol table references. Conventionally, application modules that are to be linked into an operating system kernel include the following sections of code: (1) a section of operating system "kernel" code, (2) a section of code to handle initialization of the module, and (3) a section of code to handle module cleanup when the module is in the process of being removed.

These application modules are considered, essentially, to be dynamically loadable parts of the operating system kernel. But operating system kernels provide a very complex and low level interface to these application software modules, complicating the process of developing such application software and requiring the programmer to directly address and write operating system kernel code, code to handle initialization/loading of the application software, and code to handle unloading/cleanup after termination. Furthermore, there is generally no defined and stable application programming interface within an operating system, and required data structures and interfaces change especially rapidly in operating systems, such as, for example, BSD and Linux, further complicating the programmer's development and implementation of the application software. Creating and loading/unloading the modules is often complex, time consuming, and requires constant monitoring and updating of the code to ensure reliable, error-free implementation.

What is desired, therefore, are systems and methods to overcome the above described and other disadvantages of the conventional system and methods for dynamically linking modules into a running operating system kernel.

SUMMARY OF THE INVENTION

The present invention provides systems and methods for dynamically linking modules into a running operating system kernel. The systems and methods of the present invention overcome the above described and other disadvantages of the conventional systems and methods. For example, the systems and methods specified herein (1) permit an application programmer to write, compile, execute, and terminate application code that is to be loaded into a kernel as if the application code was an ordinary (i.e., not kernel loadable) application program, (2) allow a standard programming environment to be used to encapsulate application software in a familiar environment, and (3) permit automatic cleanup of errors and freeing of program resources when the application terminates. The present invention preserves the advantages of in-kernel programming by providing an application program access to the hardware address space seen by the kernel, as well as access to kernel data structures, internal kernel services and to privileged machine instructions.

Advantageously, the present invention can be applied to a wide range of application environments (what the application programmer sees) and kernel environments (the underlying programming environment). For example, we have implemented the method for the POSIX threads application environment and the RTLinux and RTCore BSD kernel environments. The RTLinux kernel environment is described in U.S. Pat. No. 5,995,745, the contents of which are incorporated herein by reference.

In one embodiment, the system of the present invention enables a programmer to dynamically link application code created by the programmer into a running operating system kernel, wherein the system includes the following components: (1) an environment library comprising one or more routines for insulating the application code from the operating system environment and for implementing a uniform execution environment; (2) a build system for constructing a loadable module from the application code and the environment library; (3) an execution library comprising one or more routines for encapsulating the readable module within a standard executable program file, transparently loading the loadable module into the running operating system kernel, setting up input/output channels that may be required, passing arguments to the loadable module, and terminating and unloading the loadable module after receiving a termination signal; (4) an infrastructure library comprising one or more routines that may need to be executed prior to loading the loadable module into the running operating system kernel and/or after unloading the loadable module from the kernel (such routines may include routines to allocate stable memory (memory that will need to be held after the module completes and is unloaded), routines to initialize a list of modules that will be managed, routines to free memory used by the module, and routines to close files and free semaphores and other resources used by the module); and (5) a build system for constructing the executable program from the loadable module and the execution library, wherein the executable program may be in several files or a single file.

In another aspect, the present invention includes a computer readable medium, such as, for example, an optical or magnetic data storage device, having stored thereon the execution library, the environment library, the infrastructure library, and the build system.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENT

In the following description, for purposes of explanation and not limitation, specific details are set forth, such as particular systems, computers, devices, components, techniques, computer languages, storage techniques, software products and systems, operating systems, interfaces, hardware, etc. in order to provide a thorough understanding of the present invention. However, it will be apparent to one skilled in the art that the present invention may be practiced in other embodiments that depart from these specific details. Detailed descriptions of well-known systems, computers, devices, components, techniques, computer languages, storage techniques, software products and systems, operating systems, interfaces, and hardware are omitted so as not to obscure the description of the present invention.

Figure 1:
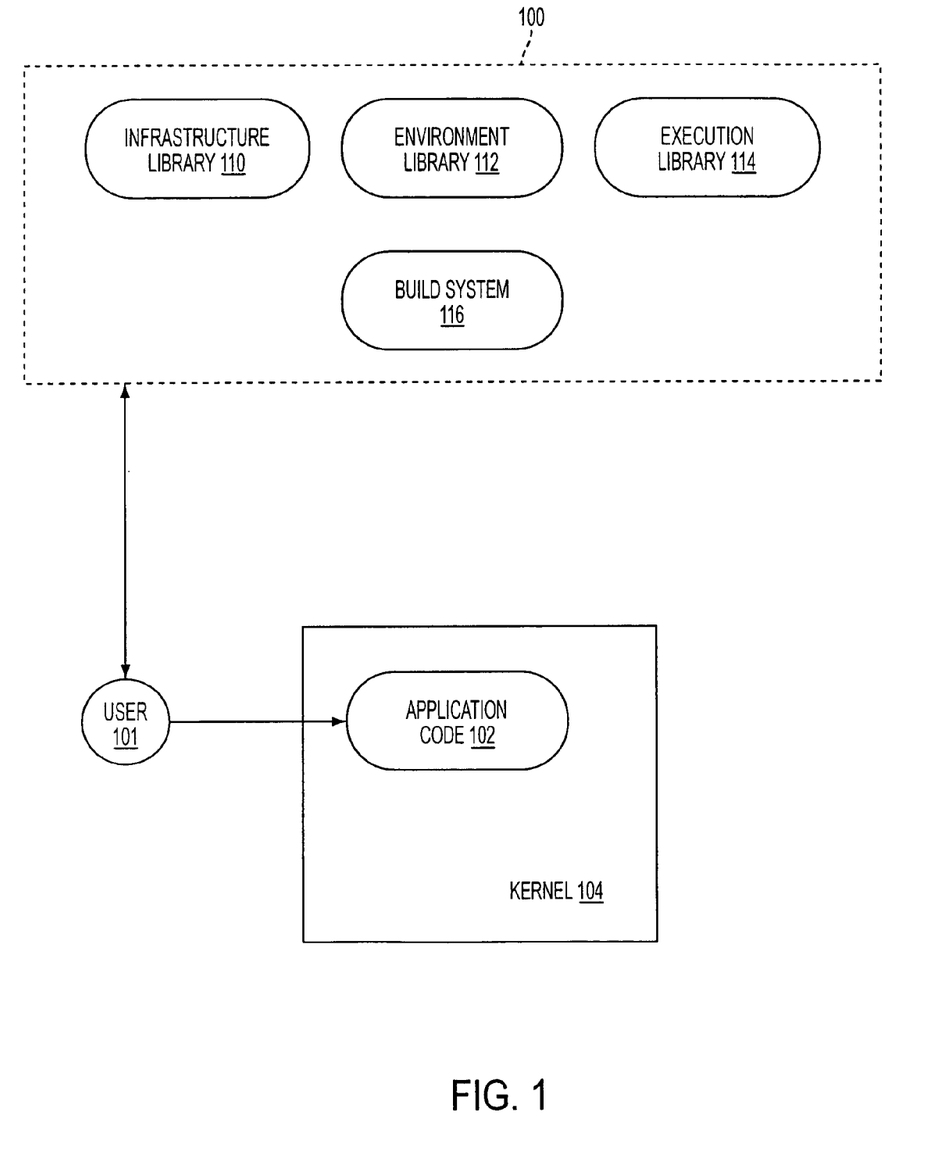
FIG. 1 is a functional block diagram that illustrates the components of a system according to one embodiment of the invention.

FIG. 1 is a functional block diagram that illustrates the components of a system 100, according to one embodiment of the invention, for dynamically linking application code 102 into a running operating system kernel 104. Application code 102 is code written by a user 101 of system 100. In one embodiment, the code is written as a standard "C" program and includes the "main" function. Example application code that can be used with system 100 is provided in the file "example.c", which is included in the above referenced computer program listing appendix.

As shown in FIG. 1, system 100 includes an infrastructure library 110, an environment library 112, an execution library 114, and a build system 116. As used herein, the term "library" means: "a set of one or more routines," and the term "routine" means: "a set of one or more program instructions that can be executed." Preferably, each library 112, 114, and 116 is stored in a separate file, but this need not be the case. The libraries could all be stored in one file, in multiple files, or in any other suitable storage architecture or arrangement.

Figure 2:
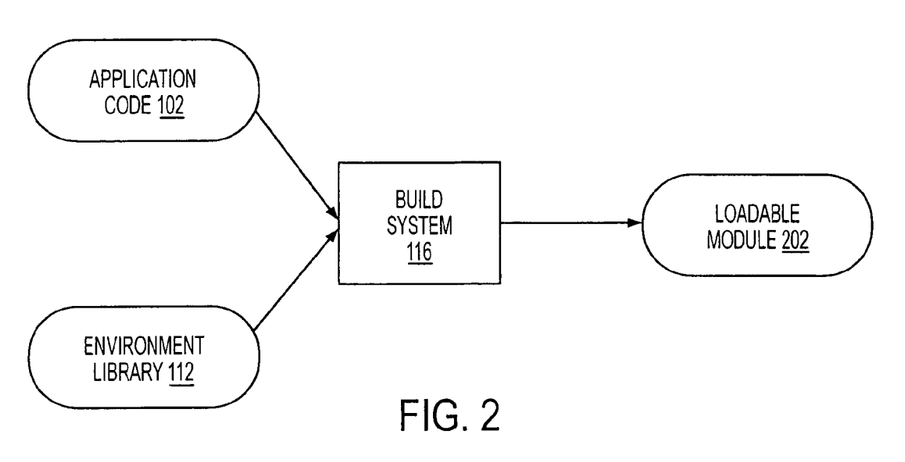
FIG. 2 is a diagram illustrating a first function of a build system component of the invention.
Figure 3:
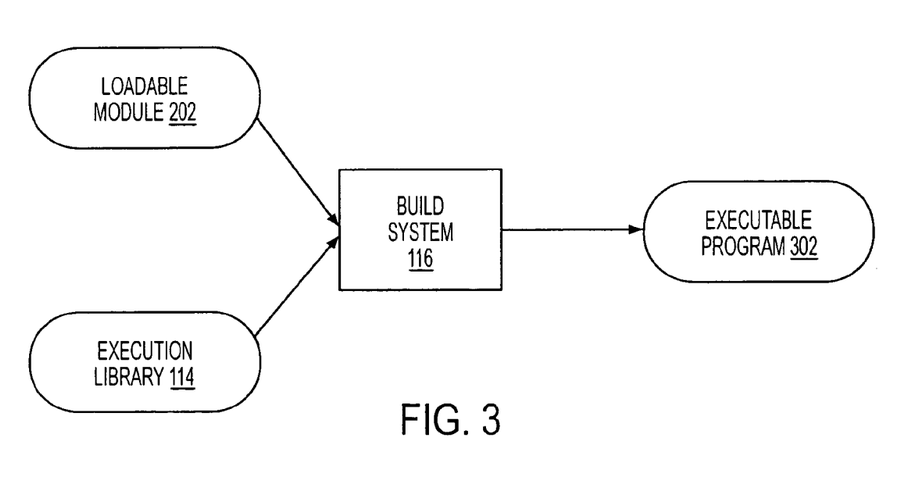
FIG. 3 is a diagram illustrating a second function of a build system component of the invention.

Build system 116 is configured to construct a "loadable module" 202 from application code 102 and environment library 112, as is illustrated in FIG. 2. As used herein the term "loadable module" means "object code produced from the application code and environment library." In one embodiment, the build system 116 includes one or more makefiles. As further illustrated in FIG. 3, build system 116 is configured to construct an executable program 302 from loadable module 202 and execution library 114.

Figure 4:
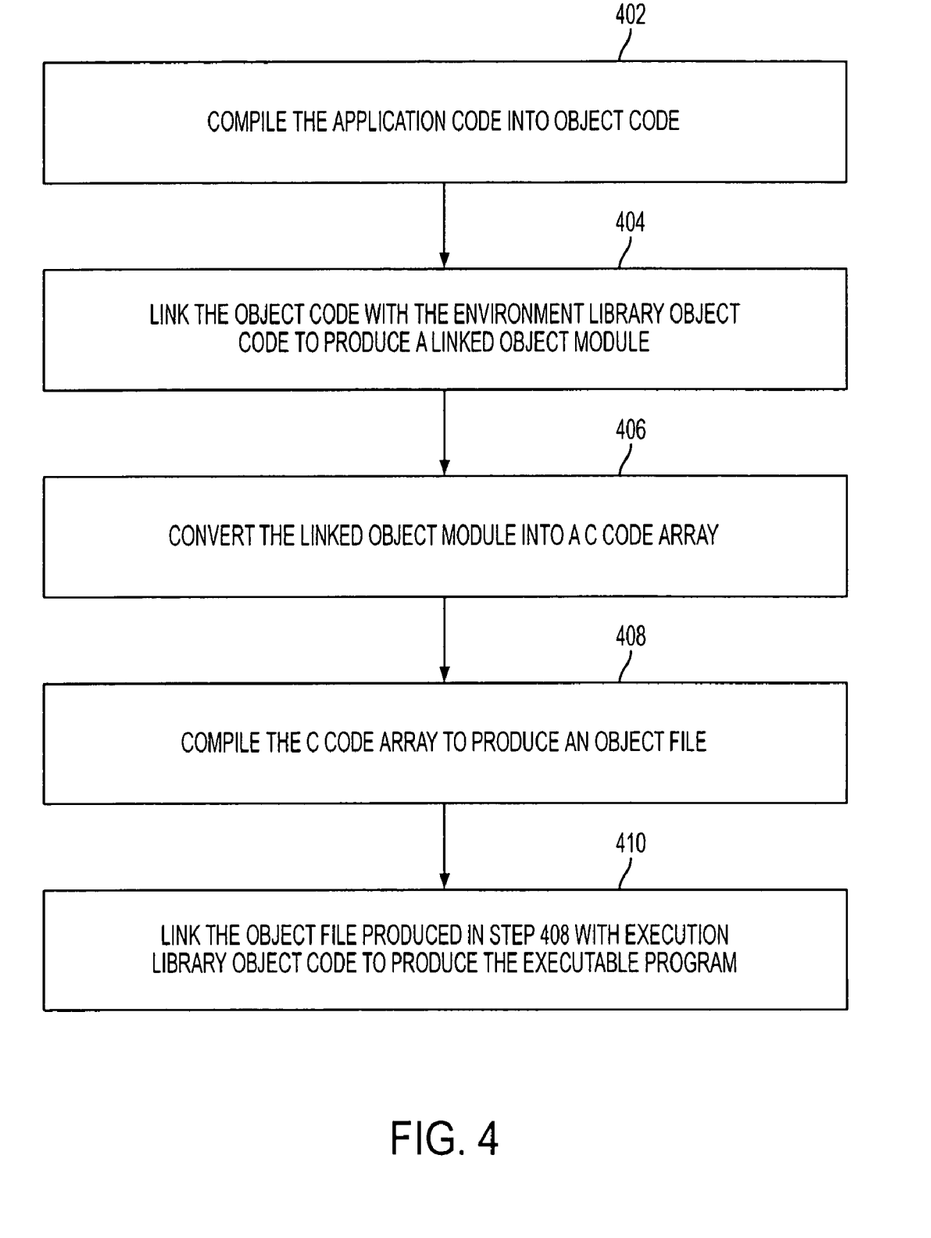
FIG. 4 is a flow chart illustrating a process 400 that may be performed by build system component of the invention.

FIG. 4 is a flow chart illustrating a process 400 that may be performed by build system 116 to create loadable module 202 and executable program 302. Process 400 can be used when, for example, the C programming language is used in implementing the invention or with any other comparable programming language. Process 400 begins in step 402, where build system 116 compiles application code 102 into object code. Next (step 404), build system 116 links the object code with the environment library 112 object code to produce a linked object module. Next (step 406), build system 116 converts the linked object module into a C code array. This C code array is the "loadable module." Next (step 408), build system 116 compiles the C code array produced in step 406 to produce an object file. Next (step 410), system 116 links the object file produced in step 408 with execution library 112 object code to produce the executable program 302.

In one embodiment, when user 101 executes program 302, a routine from the execution library 114 sets up an input channel and an output channel by connecting the standard output and standard input of the original process to the standard output and input of the process that will insert the module, and to the fifos that connect user space to kernel space. Setting up the input/output channels is optional if application code 102 does not use input/output channels. Also, when program 302 is executed a routine from execution library 114 inserts loadable module 202 into the operating system address space. Once loadable module 202 is inserted into the operating system address space, loadable module 202 begins to execute.

If application code 102, which is included in loadable module 202, uses input/output channels, then a routine from execution library 114 waits for loadable module 202 to connect via kernel/user channels, which are implemented as RTfifos in this embodiment, and then connects those kernel/user channels to the input/output channels mentioned above.

After loadable module 202 begins to execute, a routine from environment library 112 creates kernel/user channels creates a thread to execute application code 102, and then waits for the thread to complete. Creating the kernel/user channels is optional. When the thread completes, a routine from environment library 112 frees resources and unloads loadable module 202. The routines from environment library 112 may need to call routines from infrastructure library 110 for carrying out their work. For example, environment library 112 may delegate some cleanup operations to infrastructure library 110 so that cleanup can take place after loadable module 202 has been unloaded.

Example Code for Implementing the Invention

The following examples of code are for the Linux, RTLinux, and/or RTCore BSD operating systems. However, the present invention is not limited to operating only within the Linux operating system. The present invention can, for example, work with other operating systems, including: Net BSD and Free BSD, Apple OS X, other UNIX type operating systems, WindRiver's VxWorks system, and Microsoft's XP and NT operating systems.

Example code for implementing execution library 114 is provided in the file "user.c", which is included in the above referenced computer program listing appendix. This code is merely an example and should not be used to limit the invention.

Figure 5:
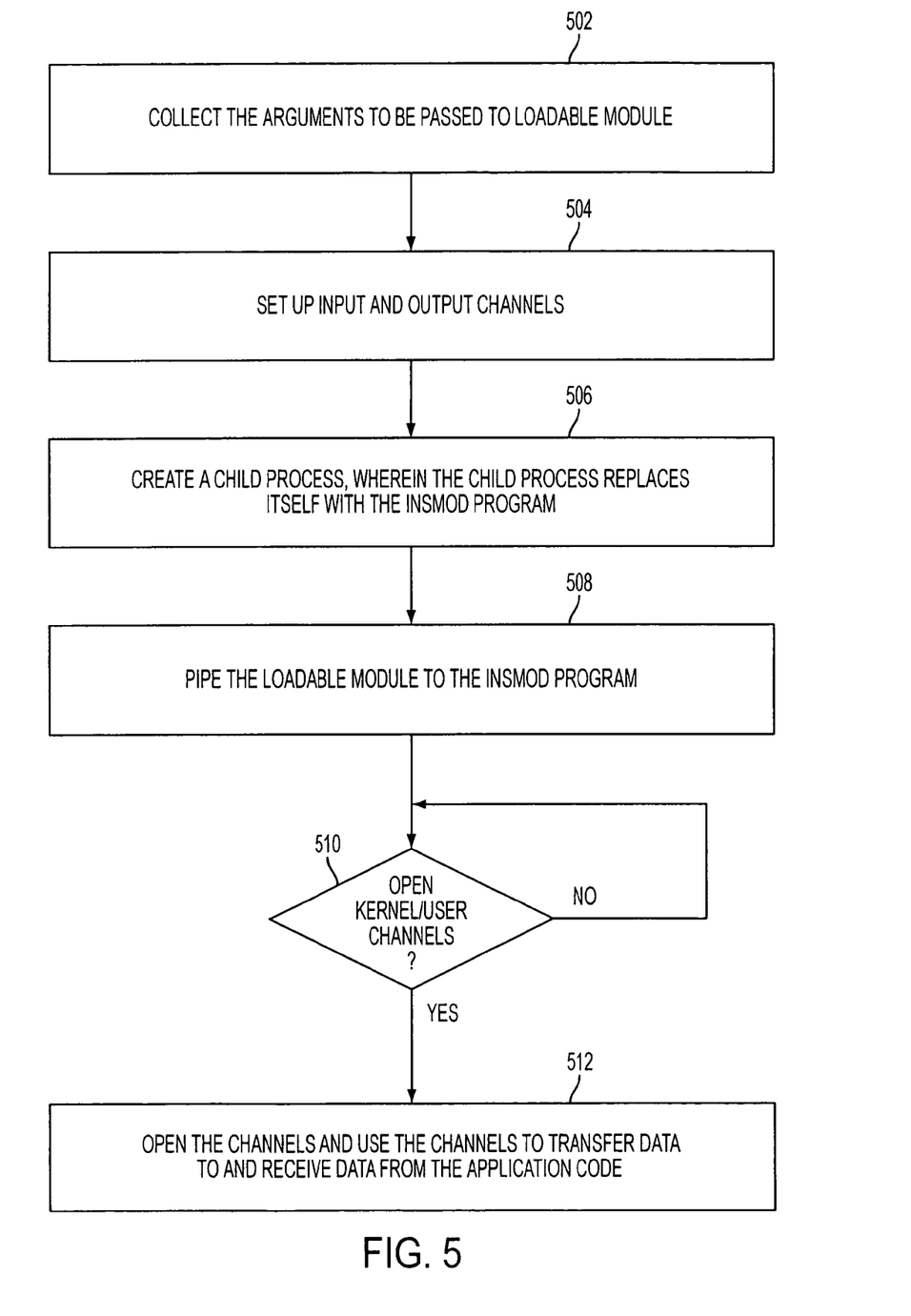
FIG. 5 is a flow chart illustrating a process performed by the "main" routine of the execution library component of the invention.

The example code for implementing execution library 114 is written in the C language and includes a "main" routine. This main routine is the first routine that is executed after user 101 executes executable program 302. FIG. 5 is a flow chart illustrating the process 500 performed by the main routine. As shown in FIG. 5, the main routine collects the arguments to be passed to loadable module 202 (step 502). Next (step 504), the main routine sets up the input and output channels. Next (step 506), main routine creates a child process by executing the fork( ) routine. The child process immediately replaces its process image with the insmod process image. The child process does this by executing the execl( ) routine.

Next (step 508), the main routine pipes loadable module 202 to the insmod process. This causes the insmod process to put loadable module 202 with arguments in kernel address space. When the application code within loadable module 202 begins running in kernel space, a routine within loadable module 202 will create kernel/user channels (e.g., RTCore "fifos") that move data between kernel and user space.

The main routine waits until it can open these kernel/user channels (step 510). Once it can open the channels it does and then uses the channels to transfer data back and forth so that data coming from loadable module 202 is sent to the standard output of executable program 302 and data coming into the standard input of executable program 302 is transmitted via the kernel/user channel to loadable module 202 (step 512).

Example code for implementing environment library 112 is provided in the file "rtl_crt0.c", which is included in the above referenced computer program listing appendix. This code is merely an example and should not be used to limit the invention.

As discussed above, environment library 112 includes one or more routines for insulating application code 102 from the operating system environment and implementing a uniform execution environment. That is, instead of depending on a changeable and specialized operating system interface, the program can use standard "C" interfaces—or alternatively, any standard application programming interface. For example, in the current embodiment of the invention, instead of using a Linux kernel "sys_open" operation applied to some terminal device so that the program can output data, the program can simply use the standard "printf" routine. Instead of using some OS dependent routine for generating a thread, the program can use "pthread_create"—a POSIX standard function.

As shown in the example code, environment library 112 includes an initialization routine called "init_module( )" for performing the functions of insulating application code 102 from the operating system environment and implementing a uniform execution environment. The init_module routine is executed as soon as the module is loaded into the kernel address space and is executed in the context of the process that invokes the insert/load operation. The init_module performs the following steps: (1) copies in arguments that have been passed to it by the execution library and that were passed to the execution library by the user or program that invoked the process, (2) creates the kernel/user channels that connect loadable module 202 to the executable program 302, (3) requests a block of memory from the operating system and stores a "task" structure that describes the application in the module to the infrastructure library, (4) puts the data describing application code 102 on a "task" list that is used by the infrastructure library to control all the modules that it manages, and (5) creates a Linux kernel thread to run a "startup_thread" routine, which is included in the infrastructure library 110 and which is describe below.

As further shown, environment library 112 may also include a cleanup routine. The cleanup routine included in the example environment library is called "cleanup_module." The cleanup_module routine performs the following task: (1) removes from the task list the task (i.e., the data describing application code 102; (2) waits for the kernel thread to terminate; (3) closes the channels created by the init_module; (4) cleans up state by freeing memory, closing files, and releasing semaphores and possibly other resources; and (5) frees the block of memory that was used to store the task structure.

Example code for implementing infrastructure library 110 is provided in the files "mainhelper.c" and "mainhelper.h", which are included in the above referenced computer program listing appendix. This code is merely an example and should not be used to limit the invention.

The example infrastructure library 110 includes the "startup_thread" routine. As discussed above, the init_module routine creates a Linux kernel thread to run the startup_thread routine. As is illustrated from the example code, the startup_thread routine does some operating system specific setup by detaching the kernel process from any terminals ("daemonize" in Linux), and filling in information in the task structure such as the identity of the current kernel thread, and then executes application code 102 by calling the "task" function. After executing application code 102, the startup_thread routine waits for application code 102 to terminate. When application code 102 terminates, the startup_thread routine sends the application code 102 return value down the output channel, signals completion, and exits. By signaling completion, the startup_thread routine causes the cleanup_module routine to execute.

The example infrastructure module 110 further includes a routine called "rtl_main_wait." This routine implements the function to wait for the application kernel thread to complete. The function "rtl_main wait" is called in the application after threads are started so that the "main" routine can safely be suspended until the subsidiary threads are completed.

Example code for implementing build system 116 is provided in the file "Makefile", which is included in the above referenced computer program listing appendix. This code is merely an example and should not be used to limit the invention.

Example Applications of the Invention

In general, all of the modules described below require the addition of application code to a running or booting operating system—the basic functionality provided by loadable kernel modules. Utilizing the present invention, the modules are all (1) simpler to develop and debug, (2) simpler to connect to other components to make a useful software system, and (3) more reliable. Since development time and software reusability (connection to existing software applications) dominate the costs of producing software, the invention provides a significant economic value. In addition, the present invention provides the programmer with a familiar, less complicated development environment, and does not require the programmer to handle complicated kernel-related initialization/loading and unloading/cleanup functions. The invention, thus, facilitates more reliable, error-free application code.

Figure 6:
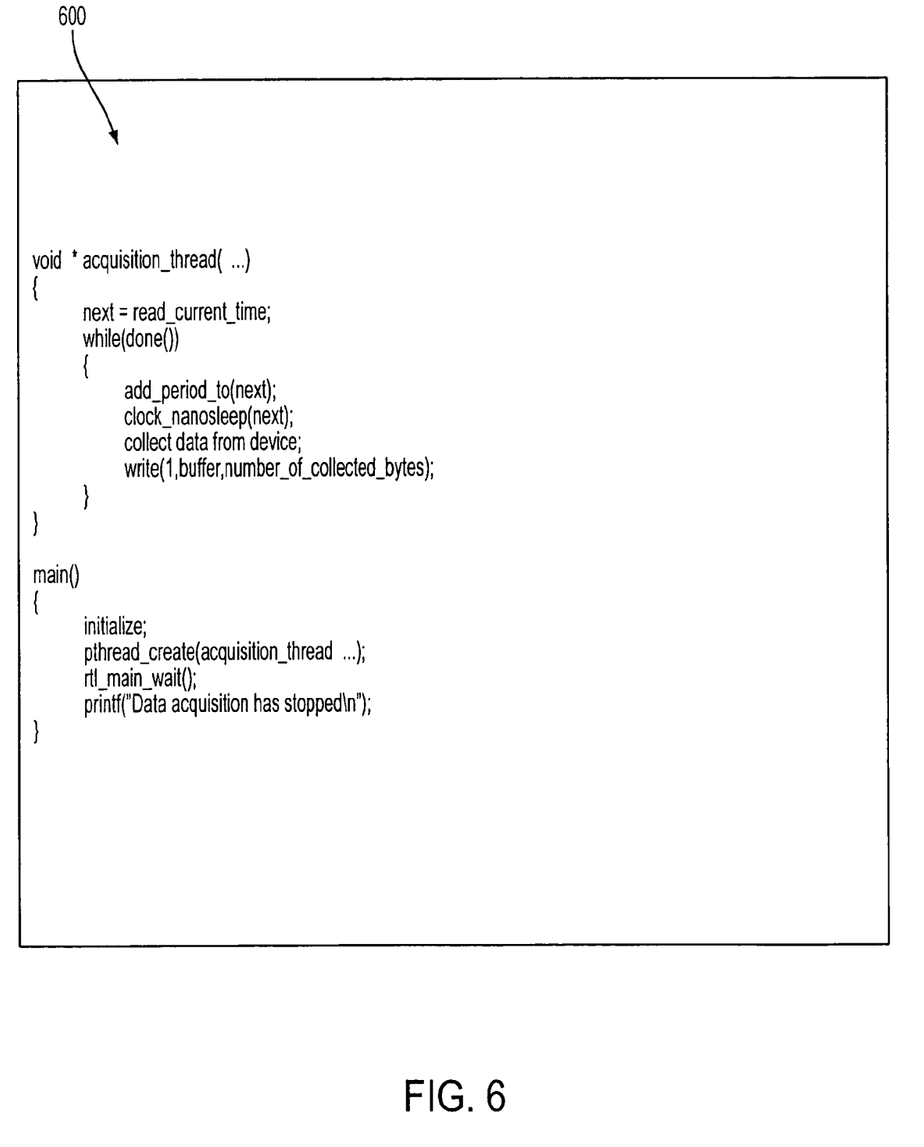
FIG. 6 illustrates example pseudo-code of an example loadable module.

(1) A Real-Time Data Acquisition Module Under RTLinux:

The present invention enables a loadable kernel data acquisition module to be developed and tested as if the module were a standard non-kernel module. To develop a real-time data acquisition system in RTLinux using the invention all one needs to do is write a program that runs under the UNIX operating system. The program should include a main program and a thread. The thread should be configured to sample data from the device from which data is to be acquired (e.g., a voltage sensor) at a fixed interval and then write the data to standard output. The program text in pseudo-code 600 is shown in FIG. 6.

This program can be tested for logical correctness under any POSIX compliant standard UNIX. After testing for logical correctness, the program can be rebuilt using build system 116 to create an executable program that can be run under RTLinux or RTCore BSD, for example. The complexity of launching the thread into the real-time operating system, connecting the thread to data streams, and closing the module on termination is now all hidden to the application. The module can be tested on a UNIX command line with the command: % data_acquisition>test_file.

(2) A Device Driver Module:

As noted herein, the invention provides a means of simplifying and automating module deployment and testing. Currently, the most common use for loadable kernel modules is for device drivers that are not statically linked into the operating system. Drivers in loadable kernel module form allow an operating system to configure itself on boot—adding drivers for devices it detects—and allowing users and system administrators to update systems by, for example, upgrading a disk drive or a communications device and adding a new driver without re-booting a system and interrupting other functions.

However, driver modules are often very dependent on specific releases of the operating system and are notorious for failing to cooperate with other components. Using the invention, a driver developer can insulate the driver from non-relevant operating system internal changes. More importantly, a system administrator can rely on the automatic cleanup provided by the invention to improve reliability and rely on the automatic setup of communication channels to improve reports. In a Linux system, without the invention, the method for testing a loadable kernel driver module might involve the following steps: (1) the administrator logs in as root to get the correct privileges; (2) the administrator uses the "insmod" utility to attempt to load the driver; and (3) if the insmod utility works, the system administrator uses a "dmesg" utility to print out internal operating system diagnostic messages and to see if he or she can find one relevant to the driver. Suppose that the driver cannot correctly start because, for example, a prior driver for the device has not been removed. At this point, the system administrator must use the "rmmod" tool to try to remove both the new driver and the prior one, and then again tries to install the new driver. The driver writer must have correctly handled the complex case of responding to an "rmmod" request.

With the invention, the method for testing the loadable kernel driver is much simpler. The method might include simply the step of running the executable program that loads the module into the kernel. If the module needs to be unloaded from the kernel, the administrator need only execute the kill command to kill the executable program.

(3) An Encryption Module:

This example illustrates the value of the automatic creation of input/output channels by the invention. Suppose that we have a generic operating system module that provides an encryption and security stamp facility and want to attach it to a database. The command line for initiating secure operation of the database in a system utilizing the invention might be:

%(decrypt_input | my_database | encrypt_output)& so that the two security modules (i.e., "decrypt_input" and "encrypt_output") are automatically loaded and connected to the inputs and outputs of database module, "my_database". The entire system can be terminated and automatically unloaded with a single signal.

(4) A Security Module:

Loadable kernel modules are themselves potentially a security weakness of an operating system, since modules traditionally operate within the address space and with all privileges of the operating system itself. There is generally only a check on whether the user loading the module has sufficient privileges to load a module. However, the invention makes it convenient to add more sophisticated security checking either directly in the infrastructure libraries or in a root module that controls all module loads after loading. This module can validate certificates and even provide dynamic code check.

(5) A Fault Tolerant Module:

The invention provides a means of dynamically adding a fault tolerance capability to a running operating system by adding a kernel data logger. For example, the script % checkpoint_kernel | netcat 10.0.0.244:45 runs a fault tolerance module named "checkpoint_kernel" and sends the module's output to a standard program (i.e., "netcat") that directs output to a named internet site and TCP port. Using prior methods, the programmer would have had to hand code creation of an output channel in the checkpoint_kernel module and then produce further code to redirect the data to a destination and to process the destination IP and port as parameters.

Figure 7:
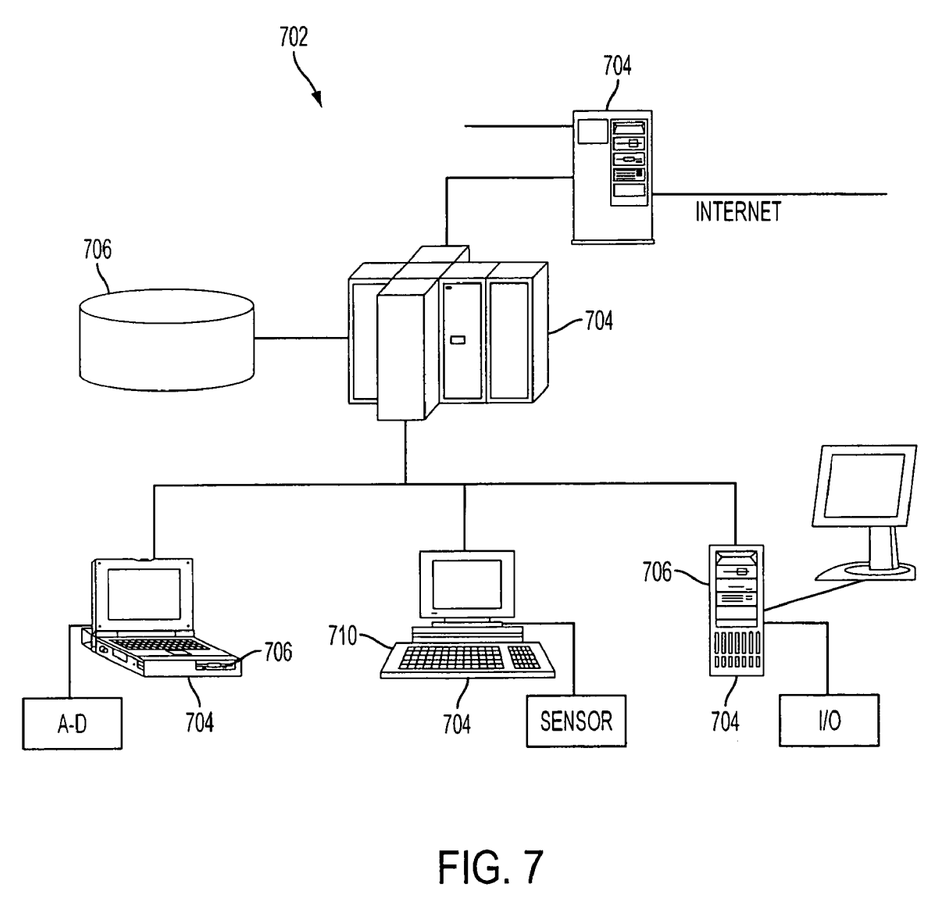
FIG. 7 illustrates a representative computer system for implementing the systems and methods of the present invention for dynamically linking application software into a running operating system kernel.

FIG. 7 is an illustration of a representative computer system for implementing the systems and methods of the present invention for dynamically linking application software into a running operating system kernel. With reference to FIG. 7, the method of the present invention may be advantageously implemented using one or more computer programs executing on a computer system 702 having a processor or central processing unit 704, such as, for example, a workstation, server, or embedded-single-board computer using, for example, an Intel-based CPU, such a Centrino, running one of the operating systems previously described, having a memory 706, such as, for example, a hard drive, RAM, ROM, a compact disc, magneto-optical storage device, and/or fixed or removable media, having a one or more user interface devices 708, such as, for example, computer terminals, personal computers, laptop computers, and/or handheld devices, with an input means, such as, for example, a keyboard 710, mouse, pointing device, and/or microphone. The computer program is stored in memory 11 along with other parameters and data necessary to implement the method of the present invention.

In addition, the computer system 702 may include an analog-to-digital converter, sensors, and various input-output devices, and may be coupled to a computer network, which may also be communicatively coupled to the Internet and/or other computer network to facilitate data transfer and operator control.

The systems, processes, and components set forth in the present description may be implemented using one or more general purpose computers, microprocessors, or the like programmed according to the teachings of the present specification, as will be appreciated by those skilled in the relevant art(s). Appropriate software coding can readily be prepared by skilled programmers based on the teachings of the present disclosure, as will be apparent to those skilled in the relevant art(s). The present invention thus also includes a computer-based product which may be hosted on a storage medium and include instructions that can be used to program a computer to perform a process in accordance with the present invention. The storage medium can include, but is not limited to, any type of disk including a floppy disk, optical disk, CDROM, magneto-optical disk, ROMs, RAMs, EPROMs, EEPROMs, flash memory, magnetic or optical cards, or any type of media suitable for storing electronic instructions, either locally or remotely.

While the processes described herein have been illustrated as a series or sequence of steps, the steps need not necessarily be performed in the order described, unless indicated otherwise.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention. Obviously, numerous modifications and variations of the present invention are possible in light of the above teachings. It is therefore to be understood that the invention may be practiced otherwise than as specifically described herein.

Thus, the breadth and scope of the present invention should not be limited by any of the above-described exemplary embodiments, but should be defined only in accordance with the following claims and their equivalents.

What is claimed is:

1. A system for dynamically linking application code created by a programmer into a running operating system kernel, comprising:

an environment library comprising one or more routines for insulating the application code from the operating system environment and for implementing a uniform execution environment, wherein the insulating of the application code allows the application code to perform a function by executing a routine that is standard to the application code instead of by using a routine that pertains to the running operating system kernel; and a build system for constructing a loadable module from the application code and the environment library and for constructing a standard executable program from the loadable module and an execution library, wherein the loadable module including a module input and a module output, and wherein the execution library comprises one or more routines for transparently loading the loadable module into the running operating system kernel, passing arguments to the loadable module, and terminating and unloading the loadable module after receiving a termination signal, the one or more routines of the execution library setting up input/output channels by connecting a standard input and a standard output of the running operating system kernel to the module input and the module output.

2. The system of claim 1, further comprising an infrastructure library comprising one or more routines executed prior to loading the loadable module into the running operating system kernel and/or after unloading the loadable module from the kernel.

3. The system of claim 1, wherein the standard executable program may be in several files or a single file.

4. The system of claim 1, wherein one of the one or more routines of the execution library includes code for executing a utility for installing the loadable module into the running operating system kernel.

5. The system of claim 4, wherein the utility for installing the loadable module into the running operating system kernel is the insmod program.

6. The system of claim 1, wherein the build system includes instructions for compiling the application code into object code.

7. The system of claim 6, wherein the build system further includes instructions for linking said object code with object code from the environment library to produce a linked object module.

8. The system of claim 7, wherein the build system further includes instructions for converting the linked object module into a C code array.

9. The system of claim 7, wherein the build system further includes instructions for compiling the C code array to produce an object file and for linking said object file with object code from the execution library to produce the standard executable program.

10. The system of claim 1, wherein the environment library includes one or more routines to create kernel/user channels.

11. The system of claim 1, wherein the environment library includes one or more routines to create a thread to execute the application code.

12. The system of claim 11, wherein the environment library includes one or more routines for freeing resources and unloading the loadable module when the thread completes.

13. The system of claim 1, wherein the environment library includes one or more routines for (a) copying in arguments; (b) creating communication channels that connect the loadable module to the executable program; (c) requesting a block of memory from the operating system and storing a structure therein that describes the application code; and (d) putting data describing the application code on a task list.

14. The system of claim 13, wherein the environment library further includes one or more routines for (a) removing said data describing the application code from the task list; (b) closing said communication channels that connect the loadable module to the executable program; and (c) freeing the block of memory that was requested from the operating system.

15. A method, comprising:
  creating a loadable module, the loadable module including a module input and a module output;
  creating an executable program; and
  executing the executable program, wherein the executable program performs a method comprising the steps of:
    setting up input/output channels by connecting a standard input and a standard output of a running operating system kernel to the module input and the module output;
    inserting the loadable module into address space of the ruining operating system kernel, wherein, once the loadable the module is inserted into the address space, the loadable module begins to execute; and
    waiting for the loadable module to connect via kernel/user channels and then connecting those kernel/user channels to the input/output channels, wherein the executable program is insulated from the running operating system kernel, and wherein the insulating of the executable program allows the executable program to perform a function by executing a routine that is standard to the executable program instead of by using a routine that pertains to the running operating system kernel.

16. The method of claim 15, wherein after the loadable module is inserted into the address space the loadable module performs a method comprising the steps of:
  creating kernel/user channels;
  creating a thread to execute application code; and
  waiting for the thread to complete.

17. The method of claim 16, wherein the method performed by the loadable module further includes the step of freeing resources after the thread completes.

18. A computer readable storage medium including a set of instructions executable by a processor, the set of instructions operable to:
  a first set of computer instructions for insulating application code from an operating system environment, wherein the insulating of the application code allows the application code to perform a function by executing a routine that is standard to the application code instead of by using a routine that pertains to the miming operating system kernel;
  a second set of computer instructions for constructing a loadable module from the application code and the first set of computer instructions, the loadable module including a module input and a module output; and
  a third set of computer instructions for constructing an executable program from the loadable module and a fourth set of computer instructions; wherein
  the fourth set of computer instructions includes computer instructions for transparently loading the loadable module into a running operating system kernel, passing arguments to the loadable module, and terminating and unloading the loadable module from the running operating system kernel after receiving a termination signal, the fourth set further includes at least one routine setting up input/output channels by connecting a standard input and a standard output of the running operating system kernel to the module input and the module output.

19. The computer readable medium of claim 18, wherein the computer instructions for loading the loadable module into the running operating system kernel include computer instructions for executing a utility for installing the loadable module into the running operating system kernel.

20. The computer readable medium of claim 19, wherein the utility for installing the loadable module into the running operating system kernel is the insmod program.

21. The computer readable medium of claim 18, wherein the second set of computer instructions includes instructions for compiling the application code into object code.

22. The computer readable medium of claim 21, wherein the second set of computer instructions further includes instructions for linking said object code with object code from the environment library to produce a linked object module.

23. The computer readable medium of claim 22, wherein the third set of computer instructions includes instructions for converting the linked object module into a C code array.

24. The computer readable medium of claim 23, wherein the third set computer instructions of further includes instructions for compiling the C code array to produce an object file and for linking said object file with object code from a library to produce the executable program.

25. The computer readable medium of claim 18, wherein the first set of computer instructions includes instructions for creating kernel/user channels.

26. The computer readable medium of claim 18, wherein the first set of computer instructions includes instructions for creating a thread to execute the application code.

27. The computer readable medium of claim 26, wherein the first set of computer instructions includes instructions for freeing resources and unloading the loadable module when the thread completes.

28. The computer readable medium of claim 18, wherein the first set of computer instructions includes instructions for (a) creating communication channels that connect the loadable module to the executable program; (b) requesting a block of memory from the operating system and storing a structure therein that describes the application code; and (c) putting data describing the application code on a task list.

29. The computer readable medium of claim 28, wherein the first set of computer instructions further includes instructions for (a) removing said data describing the application code from the task list; (b) closing said communication channels that connect the loadable module to the executable program; and (c) freeing the block of memory that was requested from the operating system.

30. The computer readable medium of claim 18, wherein the executable program may be in several files or a single file.

31. A computer system, comprising:
  first means for insulating application code from an operating system environment wherein the insulating of the application code allows the application code to perform a function by executing a routine that is standard to the application code instead of by using a routine that pertains to the running operating system kernel;
  second means for constructing a loadable module from the application code and the first means, the loadable module including a module input and a module output;
  third means for constructing an executable program from the loadable module; and
  fourth means for transparently loading the loadable module into a running operating system kernel, passing arguments to the loadable module, and terminating and unloading the loadable module from the running operating system kernel after receiving a termination signal, the fourth means includes at least one routine setting up input/output channels by connecting a standard input and a standard output of the running operating system kernel to the module input and the module output.

32. The computer system of claim 31, wherein means for loading the loadable module into the running operating system kernel include means for executing a utility for installing the loadable module into the running operating system kernel.

33. The computer system of claim 32, wherein the utility for installing the loadable module into the running operating system kernel is the insmod program.

34. The computer system of claim 31, wherein the second means includes means for compiling the application code into object code.

35. The computer system of claim 34, wherein the second means further includes means for linking said object code with object code from the environment library to produce a linked object module.

36. The computer system of claim 35, wherein the third means includes means for converting the linked object module into a C code array.

37. The computer system of claim 36, wherein the third means further includes instructions for compiling the C code array to produce an object file and for linking said object file with object code from a library to produce the executable program.

38. The computer system of claim 31, wherein the first means includes means for creating kernel/user channels.

39. The computer system of claim 31, wherein the first means includes means for creating a thread to execute the application code.

40. The computer system of claim 39, wherein the first means includes means for freeing resources and unloading the loadable module when the thread completes.

41. The computer system of claim 31, wherein the first means includes means for (a) creating communication channels that connect the loadable module to the executable program; (b) requesting a block of memory from the operating system and storing a structure therein that describes the application code; and (c) putting data describing the application code on a task list.

42. The computer system of claim 41, wherein the first means further includes means for (a) removing said data describing the application code from the task list; (b) closing said communication channels that connect the loadable module to the executable program; and (c) freeing the block of memory that was requested from the operating system.

43. The computer system of claim 31, wherein the executable program may be in several files or a single file.

44. A computer system for dynamically linking application code created by a programmer into a running operating system kernel, comprising:
means for creating a loadable module, the loadable module including a module input and a module output; and
means for creating an executable program that is configured to performs a method comprising the steps of:
setting up input/output channels by connecting a standard input and a standard output of the running operating system kernel to the module input and the module output;
inserting the loadable module into address space of the running operating system kernel, wherein, once the loadable the module is inserted into the address space, the loadable module begins to execute; and
waiting for the loadable module to connect via kernel/user channels and then connecting those kernel/user channels to the input/output channels, wherein the executable program is insulated from the running operating system kernel, and wherein the insulating of the executable program allows the executable program to perform a function by executing a routine that is standard to the executable program instead of by using a routine that pertains to the running operating system kernel.

45. The computer system of claim 44, wherein the loadable module is configured to perform a method after the loadable module is inserted into the operating system address space, wherein said method comprises the steps of:
creating kernel/user channels;
creating a thread to execute the application code; and
waiting for the thread to complete.

46. The computer system of claim 45, wherein the method performed by the loadable module further includes the step of freeing resources after the thread completes.

47. The computer system of claim 44, wherein the step of inserting the loadable module into an operating system address space includes the step of creating a child process, wherein the child process replaces its image with the insmod process image.

48. The computer system of claim 47, wherein the step of inserting the loadable module into an operating system address space further includes the step of piping the loadable module to the insmod process.

49. A method for dynamically linking application code created by a user into a running operating system kernel, comprising:
constructing a loadable module from application source code written by a user, the loadable module including a module input and a module output;
setting up input/output channels by connecting a standard input and a standard output of the running operating system kernel to the module input and the module output;
creating an executable program, wherein the executable program is configured to transparently load the loadable module into the running operating system kernel;
executing the executable program, thereby loading the loadable module into the running operating system kernel; and
unloading the loadable module from the running operating system kernel by sending a termination signal to the executable program, wherein the executable program is insulated from the running operating system kernel, and wherein the insulating of the executable program allows the executable program to perform a function by executing a routine that is standard to the executable program instead of by using a routine that pertains to the running operating system kernel.

50. The method of claim 49, wherein the application source code is an ordinary application program.

51. The method of claim 49, wherein the step of constructing the loadable module from the application source code consists essentially of executing a pre-defined makefile.

52. The method of claim 49, further comprising the step of providing a makefile to the user, wherein the user performs the step of constructing the loadable module by executing the makefile after the user has created the application code.

53. The method of claim 49, further comprising the step of providing the user with a library comprising object code, wherein the step of constructing the loadable module from the application source code comprises the steps of compiling the application source code into object code; linking the object code with object code from the library to produce a linked object module; and converting the linked object module into a C code array.

54. The method of claim 53, wherein the step of constructing the loadable module further comprises the step of compiling the C code array to produce an object file.

55. The method of claim 54, further comprising the step of providing the user with a second library comprising object code, wherein the step of constructing the executable program comprises the steps of linking the object file with object code from the second library.

56. The method of claim 53, wherein the library includes one or more routines to create kernel/user channels.

57. The method of claim 53, wherein the library includes one or more routines to create a thread to execute the application code.

58. The method of claim 57, wherein the library includes one or more routines for freeing resources and unloading the loadable module when the thread completes.

59. The method of claim 53, wherein the library includes one or more routines for (a) copying in arguments; (b) creating communication channels that connect the loadable module to the executable program; (c) requesting a block of memory from the operating system and storing a structure therein that describes the application code; and (d) putting data describing the application code on a task list.

60. The method of claim 59, wherein the environment library further includes one or more routines for (a) removing said data describing the application code from the task list; (b) closing said communication channels that connect the loadable module to the executable program; and (c) freeing the block of memory that was requested from the operating system.

61. The method of claim 49, wherein the executable program is configured to set up input/output channels.

62. The method of claim 49, wherein the executable program is configured to execute a utility for installing the loadable module into the running operating system kernel.

63. The method of claim 62, wherein the utility for installing the loadable module into the running operating system kernel is the insmod program.

64. The method of claim 62, wherein the step of inserting the loadable module into an operating system address space includes the step of creating a child process, wherein the child process replaces its image with the insmod process image.

65. The method of claim 64, wherein the step of inserting the loadable module into an operating system address space further includes the step of piping the loadable module to the insmod process.

* * * * *

UNITED STATES PATENT AND TRADEMARK OFFICE
CERTIFICATE OF CORRECTION

PATENT NO. : 7,725,888 B2
APPLICATION NO. : 10/670802
DATED : May 25, 2010
INVENTOR(S) : Yodaiken et al.

It is certified that error appears in the above-identified patent and that said Letters Patent is hereby corrected as shown below:

Claim 15, Column 11, Line 13:
"ruining" should read "running"

Claim 18, Column 11, Line 44:
"miming" should read "running"

Claim 31, Column 12, Line 48:
"system environment wherein the insulating of the application" should read "system environment, wherein, the insulating of the application"

Signed and Sealed this

Tenth Day of August, 2010

David J. Kappos
*Director of the United States Patent and Trademark Office*